United States Patent
Bruno et al.

(10) Patent No.: US 10,401,971 B2
(45) Date of Patent: Sep. 3, 2019

(54) KEYBOARD CLEANING SYSTEM (71) Applicants: Philip J. Bruno, Oakland, CA (US); Robert A. D. Schwartz, Oakland, CA (US); Paul Schwartz, Oakland, CA (US)

(72) Inventors: Philip J. Bruno, Oakland, CA (US); Robert A. D. Schwartz, Oakland, CA (US); Paul Schwartz, Oakland, CA (US)

(*) Notice: Subject to any disclaimer, the term of this patent is extended or adjusted under 35 U.S.C. 154(b) by 228 days.

(21) Appl. No.: 15/411,356

(22) Filed: Jan. 20, 2017

(65) Prior Publication Data
US 2017/0212605 A1 Jul. 27, 2017

Related U.S. Application Data (60) Provisional application No. 62/286,250, filed on Jan. 22, 2016.

(51) Int. Cl.
G06F 3/14 (2006.01)
G06F 3/02 (2006.01)
B08B 1/00 (2006.01)
B08B 13/00 (2006.01)

(52) U.S. Cl.
CPC .............. *G06F 3/0219* (2013.01); *B08B 1/00* (2013.01); *B08B 13/00* (2013.01)

(58) Field of Classification Search
CPC .................................... G06F 3/14; G06F 3/17
USPC .......... 715/709; 200/333; 400/479; 340/540; 341/176
See application file for complete search history.

(56) References Cited

U.S. PATENT DOCUMENTS

| | | | | |
|---|---|---|---|---|
| 3,165,190 A | * | 1/1965 | Laszlo | B41J 11/70 400/479 |
| 6,705,783 B1 | * | 3/2004 | Bowen | G06F 3/0202 341/176 |
| 2006/0180450 A1 | * | 8/2006 | Clark | G06F 3/0202 200/333 |
| 2011/0084835 A1 | * | 4/2011 | Whitehouse | A61B 1/00059 340/540 |
| 2018/0279766 A1 | * | 10/2018 | Kikkawa | A47L 25/00 |

* cited by examiner

*Primary Examiner* — Ruay Ho
(74) *Attorney, Agent, or Firm* — Howard Cohen (57) ABSTRACT A system for directing and compelling cleaning of the keys of the keyboard by a user carrying out a wipe-down process by detecting the keys as they are pressed during wipe-down, and analyzing the key depression data to determine the thoroughness and completeness of the cleaning cycle.

24 Claims, 5 Drawing Sheets

KEYBOARD CLEANING SYSTEM

CROSS-REFERENCE TO RELATED APPLICATIONS

This application claims the benefit of the filing date priority of Prov. Appl. No. 62/286,250, filed Jan. 22, 2016.

FEDERALLY SPONSORED RESEARCH

Not applicable.

SEQUENCE LISTING, ETC ON CD

Not applicable.

BACKGROUND OF THE INVENTION

Field of the Invention

This invention relates to a keyboard cleaning system and, more particularly, to a method and apparatus for scheduling and monitoring the cleaning of computer keyboards to reduce the spread of infection, particularly in medical institutions and facilities.

It is widely recognized that computer keyboards used in hospital and medical office settings are a significant vector point for cross-contamination of individuals and patients by a wide range of pathogens (bacterial and viral). Iatrogenic infections caused by such contamination can be seriously debilitating or fatal. It is estimated that as many as 90 individuals per shift may use the same keyboard of a workstation, raising the probability of cross-contamination to a threatening degree. In this era of electronic health records, doctors and nurses may spend 50% of their time working at keyboards, often at multiple keyboards during a single shift. This use of multiple keyboards multiplies the opportunity for an infectious pathogen to be spread in chain-reaction fashion throughout an office or institution.

Although these facts are generally recognized throughout the medical community, it remains difficult to establish and sustain a cleaning regimen that is applied consistently. In medical settings many (or most) workers have stringent schedules and immediate demands on their time, and stopping to clean the computer keyboard is a low-priority task. And, since infectious pathogens may not be visible or detectable by an individual, the concern for their propagation may be overcome by more immediate concerns.

There is need in the prior art for a system that establishes a cleaning regimen for computer keyboards used in medical settings (and elsewhere), and that monitors the application of the cleaning regimen to reduce pathogenic transmission below a minimum acceptable level.

SUMMARY OF THE INVENTION

The invention comprises a system that establishes a cleaning regimen for computer keyboards used in medical settings (and elsewhere), and that monitors each cleaning cycle of the cleaning regimen to reduce pathogenic transmission below a minimum level. The keyboard cleaning system includes cleaning software comprised of a client based software package with an optional server component, as well as a keyboard switch or other actuating means to activate a cleaning cycle.

The cleaning software provides a method to monitor and schedule or request the cleaning of computer keyboards to reduce the spread of infection. The software encourages computer users to take the time necessary to wipe-down and sanitize a keyboard. A key feature of the cleaning system is that it may set a cleaning cycle based on a calendar schedule, or on the number of users of the keyboard, or the elapsed total user time of a keyboard since the most recent cleaning cycle.

A significant feature of the cleaning system is that it interacts with the logged-in user during the cleaning cycle to monitor key press data as the wipe-down progresses to assess the efficacy of the cleaning cycle as it is carried out and to direct the wipe-down process to completion. In addition, the interaction with the logged-in user may be used to establish personal responsibility of the user for carrying out the cleaning cycle completely and thoroughly.

The cleaning system software runs in the background on the computer. While running in the background the cleaning software can monitor a calendar schedule to popup keyboard cleaning reminders to the currently logged in user. On the client only version (without server) the software may allow the user to create a cleaning schedule and record successful and unsuccessful cleaning cycles. While running in the background the cleaning application can be triggered by an external server application, or the application can query the server for it preprogrammed cleaning schedule. This is known as push versus pull notification. The application can operate in either mode. In addition, the invention may provide a keyboard switch so that the cleaning cycle can be launched by pressing a button on the keyboard.

To direct the cleaning wipe-down, the cleaning application displays a graphic of the keyboard and shows, by changing the color or representation of the keys, which keys have been cleaned and the ones needing further cleaning, thus giving feedback to the user and guiding the cleaning process to completion. This feedback is a notable improvement over the prior art.

In addition, the cleaning application can store the cleaning results each time the key board is cleaned. The cleaning application also can store data regarding when the cleaning was not completed correctly, or when the cleaning request was ignored. And, the cleaning application stores the identification of the user who was logged in at the time any of the above cleaning data was collected. All of this data may be stored and reported to a server application. The cleaning data may be used by infection control personnel or administrative officials to assign personal responsibility for each cleaning cycle, based on log-in data, and create a very strong personal incentive for the logged-in user to heed cleaning reminders and assure that effective keyboard cleaning is carried out.

Both the client and server applications are capable of calculating and displaying analytical data. In addition to hardware keyboards, the cleaning application can be used in conjunction with touch screen keyboard displays as well as mouse, trackpad, or other manual input devices.

DETAILED DESCRIPTION OF THE INVENTION

Figure 1:
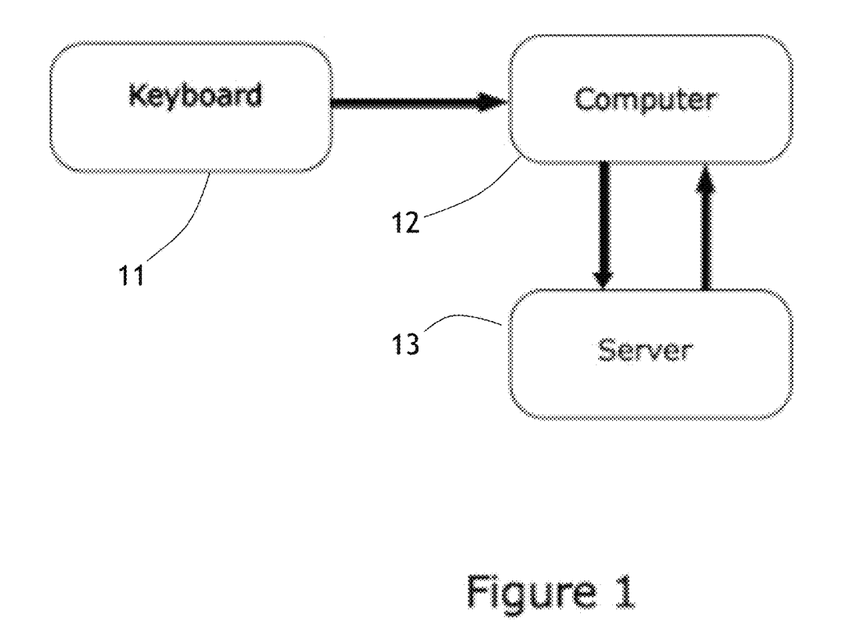
FIGS. 1 and 2 are functional block diagrams depicting the connection of the keyboard, computer, and server in the present invention.
Figure 3:
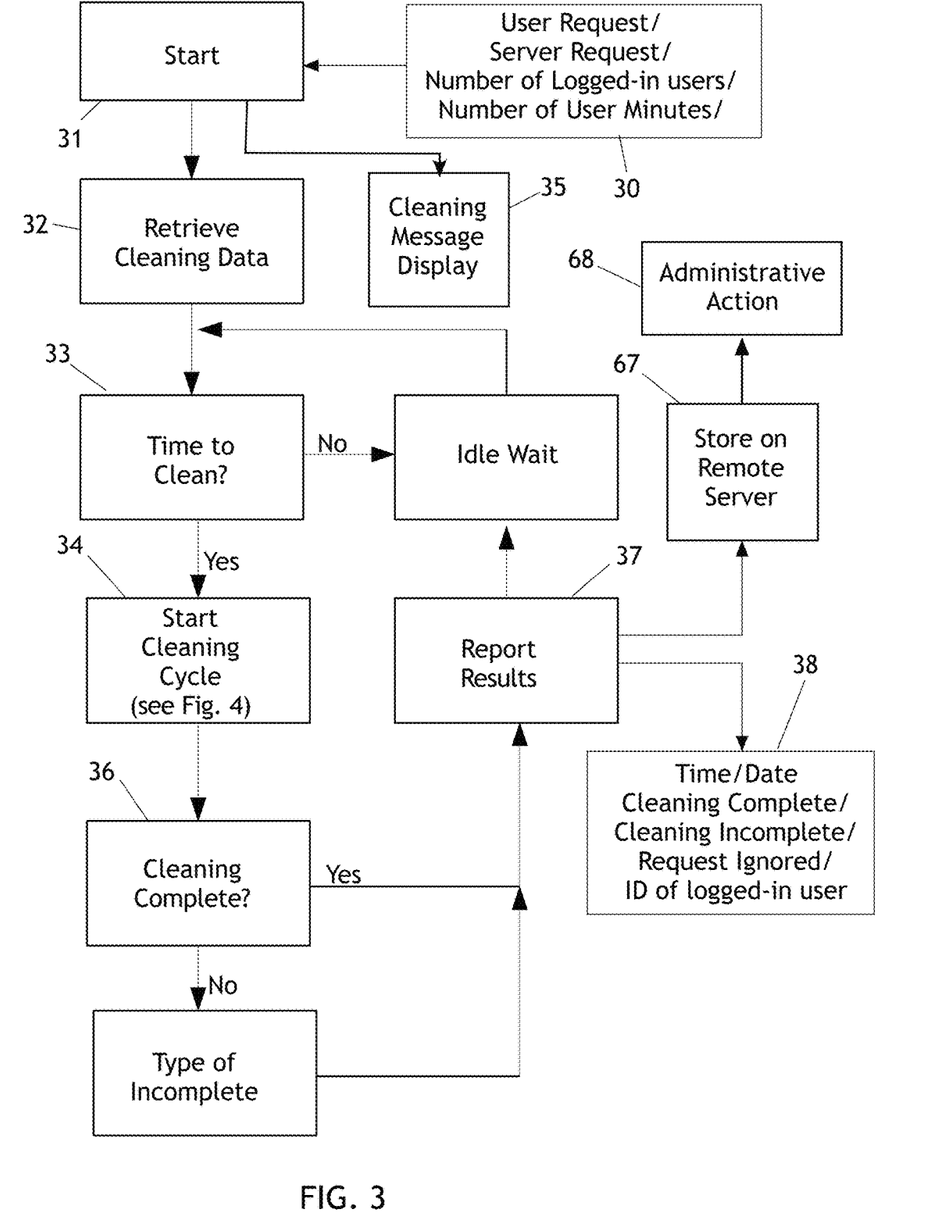
FIG. 3 is a functional block diagram of a one method of the invention that carries out a basic keyboard cleaning cycle.

FIG. 1 is a functional block diagram of the invention that shows the cleaning system operating in server mode, in which a keyboard 11 is connected to a computer 12 that is in turn connected to a server 13. In this mode the cleaning cycle is initiated by one of several methods (FIG. 3). The operator can press a cleaning button 21 on the key board (FIG. 5) to activate the cleaning cycle either in response to a server request, or user request. Alternatively the server may push a message down to the client application running on the computer to start a cleaning cycle. Or, the cleaning application may query the server to find out if a cleaning cycle is required. This is termed pulling the message as it is useful in networks with complex firewalls. The cleaning cycle is typically carried out by wiping down the keyboard with one or more swabs having an antiseptic substance(s) embedded therein.

Figure 2:
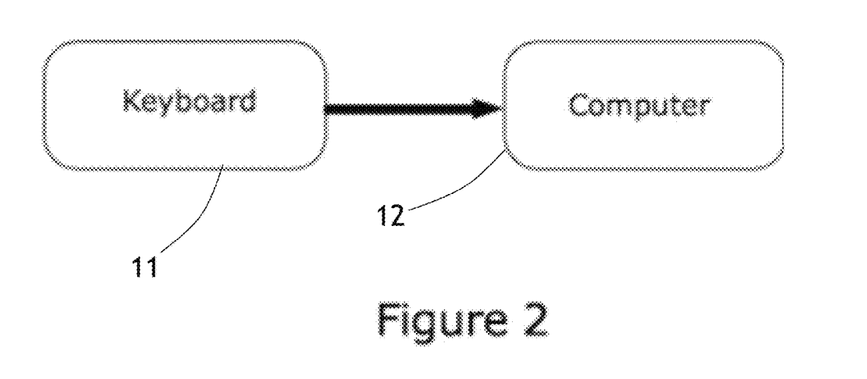

FIG. 2 shows the client application operating in stand alone mode. In this mode there is no connection to any server, or the connection to the server is not available. The client application monitors an internal schedule to activate cleaning requests. The user can at any time activate a cleaning cycle by pressing the button 21 on the keyboard. In stand alone mode a schedule may be created by the client application by the user inputting the schedule in a series of dialogs.

In all other ways the standalone application operates just like the server-connected version except that the cleaning requests are internally created and all storage is on the local computer.

Once the cleaning cycle starts the keyboard sends information to the computer telling it which keys have been cleaned. When all the keys are clean the client application closes and records a successful cleaning to the server. If the user dismisses the client application and does no cleaning the fact that no cleaning was done as a result of the request is recorded on the server. If the cleaning was only partially completed that fact is recorded on the server. All records on the server carry details of which computer and which user was logged in at the time of the event (complete cleaning, partial cleaning, or no cleaning).

As noted above, the button 21 at the top of the keyboard (the cleaning button) can be pressed at anytime to start a cleaning cycle. The software may also provide a 'Clean' option in a pull-down menu 23 that will also start a cleaning cycle, as will using the left mouse button to double click on an onscreen cleaning icon 24, or to click on an onscreen cleaning reminder notification. With regard to FIG. 3, further prompts 30 to start the cleaning cycle may include the total number of keyboard users who have logged-in since the previous cleaning cycle, or the total number of user minutes since the previous cleaning cycle. These factors are significant predictors of accumulated keyboard contamination, and can be used to override and supersede a fixed cleaning schedule.

Figure 5:
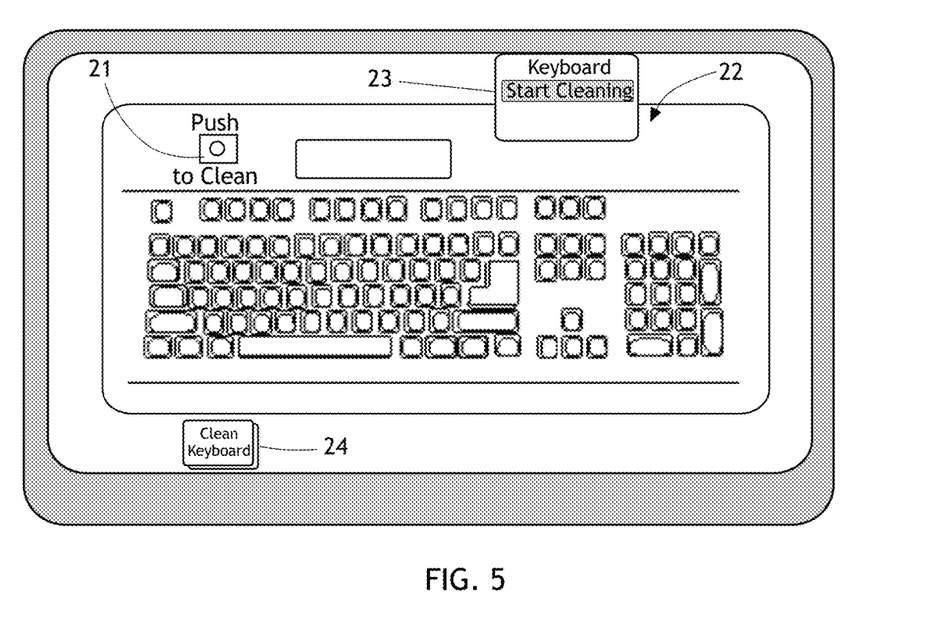
FIG. 5 is a computer keyboard layout including a "Push to Clean" button to begin a cleaning cycle.

When a cleaning cycle starts (reference numeral 31, FIG. 3), an image 22 of the keyboard will appear on the computer display screen (FIG. 5). This action disengages only the keyboard from the computer system, and Num lock, Caps lock and Scroll lock LED's will flash simultaneously indicating cleaning mode. This allows the freedom of wiping the surface without entering errant random keystrokes into the computer system.

As shown in FIG. 3, the cleaning software retrieves keyboard cleaning data 32 (time, date, date of previous cleaning, results of previous cleaning, etc.). If a cleaning cycle has been scheduled, or if sufficient time has elapsed since a previous cleaning cycle, or other factors 30 come into effect, it is time to clean (33) and a new wipe-down cleaning cycle is initiated (34). At step 35 a cleaning message is displayed, which may comprise an active graphic (changing colors, animated, etc.) to draw the attention of the user to the message. As cleaning the keyboard proceeds, the software will detect which keys have been pressed, and the color of those keys on the keyboard display 22 will change to signify to the operator which keys have been wiped. When all keys have been cleaned (36), a status bar indicator will appear which shows the 'wait-time' or dwell time to complete the cleaning cycle, which relates to the minimum time the wipe-down antibacterial substance should remain on the keys. When the user is through with the disinfecting process and no longer pressing keys the keyboard comes back to life in approximately 3 seconds. The software then compiles a report 37 of this cleaning cycle, and may include such information (38) as time and date, whether the cleaning was complete or incomplete, whether the cleaning request was ignored or not, the identification of the user who was logged-in at the time of the cleaning event, and the unique identifying serial number of the keyboard.

All of this data may be stored and reported to a remote server application. The cleaning data 38 may be used by infection control personnel or administrative officials to assign personal responsibility for each cleaning cycle, based on log-in data, and thus creates a very strong personal incentive for the logged-in user to heed cleaning reminders and assure that effective keyboard cleaning is carried out.

A significant feature of the cleaning system is an algorithm to overcome the n-key rollover problem. N-key rollover is a well known problem in the keyboard industry and is caused by the typical construction of keyboard electronics. N-key rollover occurs if the user presses down on too many keys at once (as is typical when wiping the keyboard during cleaning), resulting in only some of the keys actually being registered by the keyboard electronics. Consequently the key press information delivered to the computer is inadequate, incomplete, and erroneous. One method in the prior art for solving the n-key rollover problem is to place diodes in the switching mechanism to isolate each key's signal. Because each key switch requires a diode this is expensive.

Figure 6:
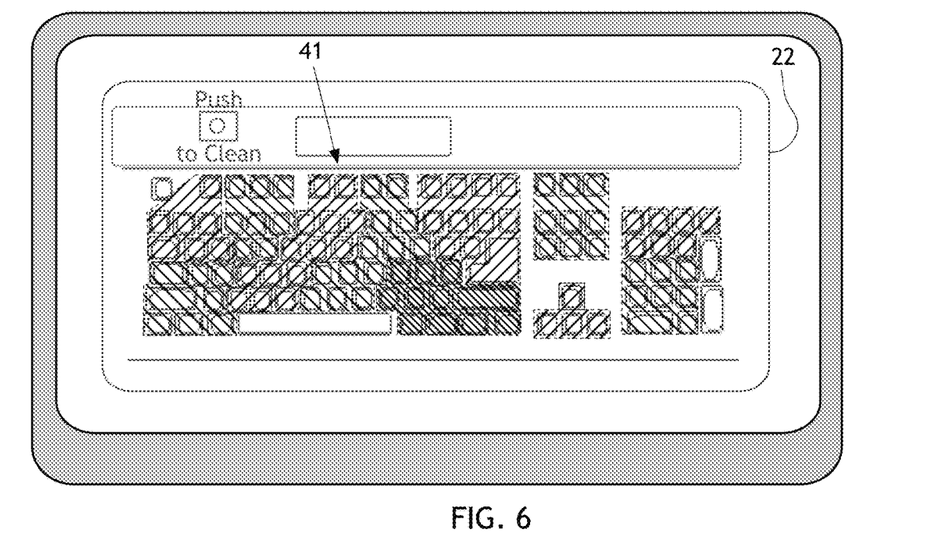
FIG. 6 is a computer keyboard layout as in FIG. 5, showing one embodiment of defined key zones for analyzing completeness of a cleaning cycle.

The cleaning system of the invention avoids the complexity and expense of these diodes. Rather, the methodology of the invention operates by dividing the keyboard into key zones that each encompass a subset of adjacent keys. With regard to FIG. 6, the software places an image 22 of the keyboard on the computer display, as described above. In addition, a plurality of key zones 41 is displayed on the keyboard image 22, each zone 41 depicting one or more adjacent keys that will be monitored and assessed as a group to assure that all the keys have been cleaned to a predetermined standard. In FIG. 6 each zone is depicted as a boundary encompassing at least one key, and the zone is cross-hatched to distinguish it from the adjacent zones. The cross-hatching does not imply any particular color, but each zone is portrayed in its own respective color for clarity. Alternatively, the key zones 41 may be indicated by a unique color for all the keys within each zone.

The computer may accurately infer that all the keys in a particular zone have been pressed by examining keypress events in a particular zone. In each zone, the system detects how many keys have been recorded as actuated, and determines that when at least a minimum number of keys were depressed then it may be inferred that the remaining keys of the zone were not missed by the wiping action. As the cleaning process proceeds and the keystrokes are recorded, the cleaning system scores each zone and determines that it has been satisfactorily cleaned if at least the minimum number of keys are pressed. If all the zones pass, the cleaning cycle is recorded as successful, and all data are stored.

In addition, the thoroughness of the cleaning process may be directed by changing the parameters of the system. For example, the minimum number of keypresses within each zone may be increased, leading to the likelihood of an increased number of wiping strokes in order to attain the higher minimum key count. In addition, the size and location of the zones may be altered, and decreasing the size of the zones while maintaining a minimum number of keys within a zone tends to increase the probability of a more thorough cleaning.

Figure 4:
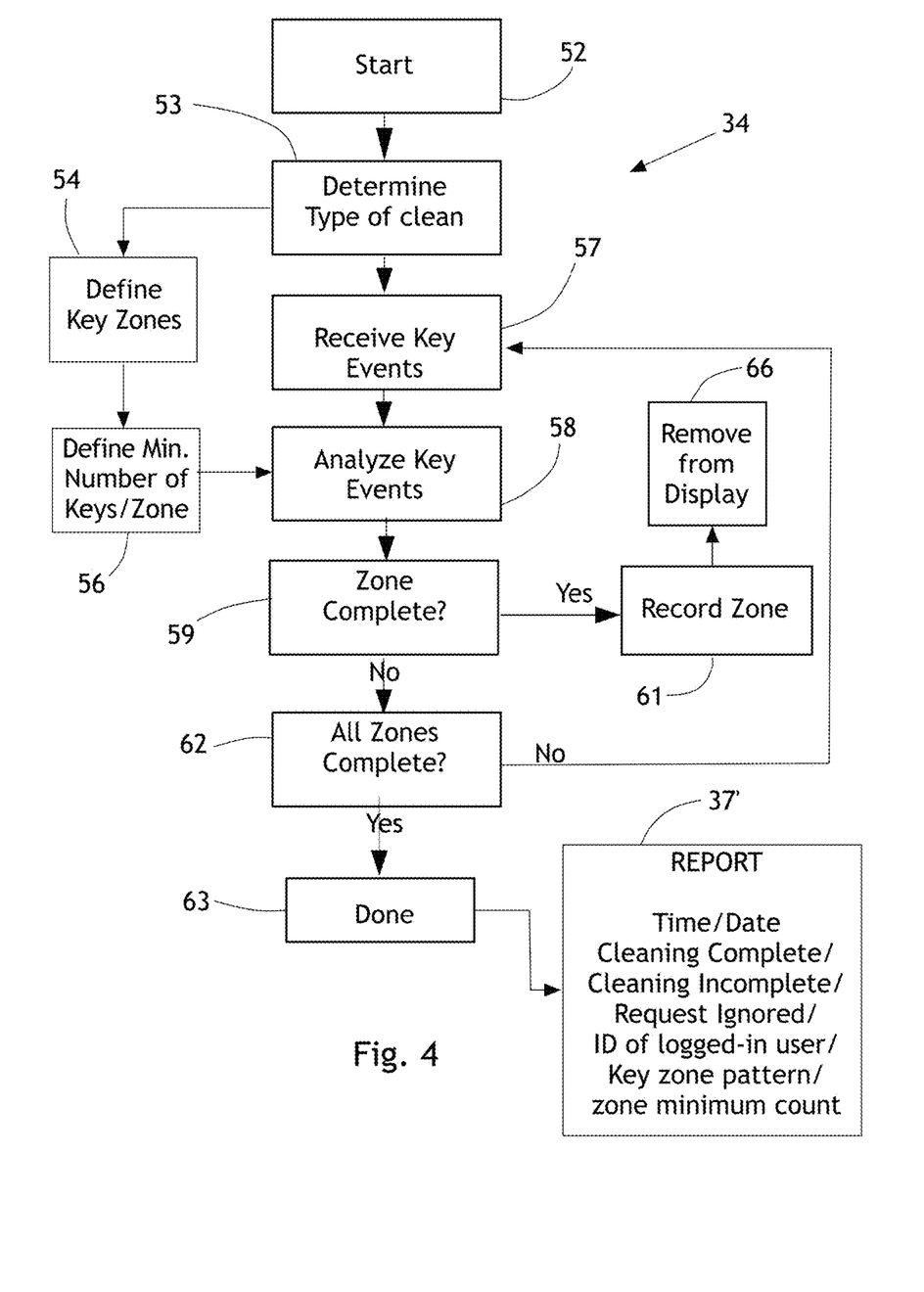
FIG. 4 is a functional block diagram of a subroutine of the invention that monitors the keyboard cleaning cycle to determine completeness of the process.

With regard to FIG. 4, the cleaning process 34 begins at Start 52, prompted by any of the factors described previously. At the next step 53, the system first determines what type of cleaning is required (complete (every key registered), high quality, standard, etc.), and then defines in step 54 a pattern of key zones 41 that suits the cleaning cycle that is required. It also defines (56) the minimum number of keys that must be recorded for each of the zones 41 in order to meet the criteria for the selected cleaning cycle. The system receives key press events (57), and at step 58 it analyzes the key presses that are detected during the keyboard wipe-down process by applying the key zones 41 and minimums (from step 56) to the incoming data.

When any zone has received a number of keypresses equal to the minimum (56), it is determined to be complete (59) and is recorded (61). Also, in step 66 the completed zone is removed from the display 56, so that the user is informed that those zone keys are cleaned, and the cleaning process may be directed to the remaining zones portrayed on the display. The system continues to receive keypresses for the remaining zones, until all zones are complete (62), and the cleaning cycle is done (63). A report 37' is then compiled, indicating all the data described previously as well as the key zone pattern and the minimum key count per zone used in analyzing the cleaning activity.

Using the key zones and the minimum number of key presses per zone, this system enable four methods that may be implemented to clean the keyboard. The method used can be set by the user or the system operator in an Options dialog. In Method One (brief cleaning), a standard key zone pattern, as shown in FIG. 6, is used, and one key from each zone must be detected. The [Esc] and [space bar] keys must be detected individually. In Method Two (standard cleaning), the standard zone pattern is also used, and the [Esc] and [space bar] keys must be detected by the software. The number of keys which must be detected in a zone depends on the number of keys within the zone, as follows:

4 key zones: any 2 of the 4 keys must be detected;
5 key zones: any 2 of the 5 keys must be detected;
6 key zones: any 3 of the 6 keys must be detected;
7 key zones: any 4 of the 7 keys must be detected;
8 key zones: any 4 of the 8 keys must be detected.

Figure 7:
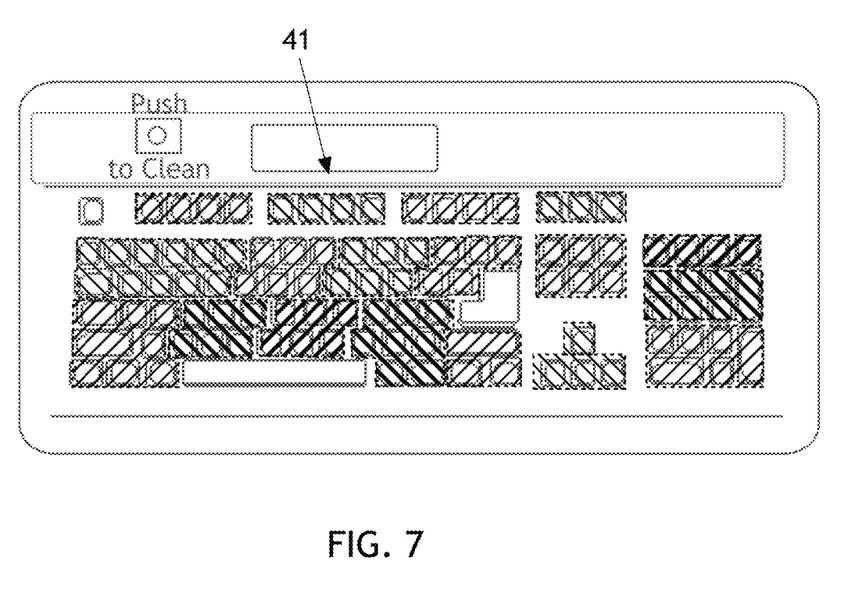
FIG. 7 is a computer keyboard layout as in FIG. 5, showing another embodiment of defined key zones for analyzing completeness of a cleaning cycle.

In Method Three (thorough cleaning), another set of zone definitions, shown in FIG. 7, is selected in step 54. The number of zones in increased significantly to raise the probability that all the keys will be treated in the wipe-down process. As before, the number of keys which must be detected in a zone depends on the number of keys within the zone:

4 key zones: any 3 of the 4 keys must be detected;
5 key zones: any 3 of the 5 keys must be detected;
6 key zones: any 4 of the 6 keys must be detected;
7 key zones: any 5 of the 7 keys must be detected;
8 key zones: any 5 of the 8 keys must be detected;
10 key zones: any 7 of the 10 keys must be detected.

Method Four (absolute cleaning) requires the user to press every key on the keyboard, and the software must detect each key. A key can only be detected by the software if the keyboard processes that key. This method guarantees that each key is pressed (cleaned) by the user, but most often will require some keys to be pressed more than once.

The default method is method 3, which implements a cleaning process that is thorough but not necessarily absolute.

In addition, keystroke analytics may be used during normal use of the keyboard to determine which keys are most used, and that data may be applied by centering zones on those most-used keys to assure that they are cleaned. Some highly used keys, such as the spacebar or return key, may comprise a zone of one key alone, which must be depressed by the wiping action, as noted previously. Thus, allowing the end user to select different key cleaning patterns results in a cleaning process that is appropriate for the recent usage of the keyboard. Using this methodology the cleaning process can be made less thorough, but easier to complete, or more thorough but harder to complete, in accordance with the requirements of the situation.

With reference to FIGS. 1, 3 and 4, the report 37 or 37' of each cleaning cycle may be stored on a remote server 13 in step 67. Thereafter, the reported results may be reviewed and subject to administrative action 68. For example, infection control officials of a hospital complex may review the data, such as time and date, whether the cleaning was complete or incomplete, whether the cleaning request was ignored or not, the identification of the user who was logged-in at the time of the cleaning event, and the unique identifying serial number of the keyboard. Among hundreds or thousands of keyboards throughout a system, it is possible to determine when each keyboard surface was cleaned, by whom and at what workstation, throughout the entire facility.

Thus the keyboard cleaning system may be used to compel compliance with the keyboard cleaning regimen by linking the logged-in user data to each cleaning cycle, thereby ascribing individual responsibility for keyboard cleaning Incomplete or missed cleaning cycles may be traced to the individual who was logged-in at the time. Therefore carrying out the cleaning regimen of the invention may be incentivized, through positive reinforcement messages to the responsible individual for cleaning cycle compliance and sanctions for ignoring a cleaning message or failing to complete the cleaning cycle.

Other significant features of this software are its ability to push desktop reminders to all clinicians that the keyboard they are about to use is in need of disinfecting, and to monitor each cleaning procedure in real time and assess its effectiveness while simultaneously overcoming the N-key rollover problem.

The keyboard cleaning system of this invention and its features can be applied to touch screen keyboard displays as well as hardware keyboards. Likewise, other manual input devices such as a trackpad, mouse or trackball, may be treated by this invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a computer system that includes an alphanumeric keyboard and a display, a system for directing cleaning of the keys of the keyboard by a logged-in user carrying out a wipe-down process, including:
   initiating a cleaning cycle and showing a cleaning indicator on said display;
   monitoring key presses during said wipe-down process to determine which keys have been wiped and cleaned;
   determining when a predetermined number of keys have been pressed during the wipe-down process to calculate when the cleaning cycle is complete,
   further including the step of defining a plurality of key zones, each key zone encompassing a plurality of adjacent keys, and wherein said predetermined number of keys comprises a minimum number of keys being pressed within each of said zones.

2. The keyboard cleaning system of claim 1, wherein said minimum number of keys being pressed within each of said zones may be adjusted to facilitate more or less stringent cleaning regimens.

3. The keyboard cleaning system of claim 1, further including the step of displaying a timer graphic to indicate a wait period to be observed while cleaning compounds of the wipe-down act to sanitize the keys.

4. The keyboard cleaning system of claim 1, further including the step of adjusting the number of said plurality of zones to facilitate more or less stringent cleaning regimens.

5. The keyboard cleaning system of claim 1, wherein said minimum number is substantially equal to all of the keys on said keyboard.

6. The keyboard cleaning system of claim 1, further including the step of portraying an image of the keyboard on the display, and graphically indicating the keys that have been wiped and cleaned and thereby graphically directing the wipedown process to treat keys not yet cleaned.

7. The keyboard cleaning system of claim 6, wherein said image of the keyboard includes said plurality of key zones, each key zone being portrayed in graphic distinction to the other key zones.

8. The keyboard cleaning system of claim 1, wherein the step of initiating a cleaning cycle includes providing a pushbutton on said keyboard that starts the cleaning cycle.

9. The keyboard cleaning system of claim 1, further including the step of recording data regarding each cleaning cycle on the computer.

10. The keyboard cleaning system of claim 9, wherein said data includes the time and date of each cleaning cycle, and the identification of the user during each cleaning cycle.

11. The keyboard cleaning system of claim 10, wherein said data includes whether each cleaning cycle was carried out to completion.

12. The keyboard cleaning system of claim 1, wherein the keyboard comprises an image of a keyboard on a touchscreen display.

13. The keyboard cleaning system of claim 1, wherein the step of initiating a cleaning cycle includes establishing a calendar reminder for conducting a cleaning cycle.

14. The keyboard cleaning system of claim 1, wherein the step of initiating a cleaning cycle includes counting the total elapsed time that the keyboard has been used since a previous cleaning cycle.

15. The keyboard cleaning system of claim 1, wherein the step of initiating a cleaning cycle includes counting the total number of users of the keyboard since a previous cleaning cycle.

16. The keyboard cleaning system of claim 1 further including a graphic depiction of a timer that sets a dwell period to be observed to allow cleaning compounds of the wipe-down process to adequately disinfect the keyboard.

17. The keyboard cleaning system of claim 16 wherein the dwell timer duration can be set from a remote server.

18. The keyboard cleaning system of claim 16, further including displaying the name of a specific pathogen that the dwell time is designated to kill.

19. In a computer system that includes an alphanumeric keyboard and a display, a system for compelling cleaning of the keys of the keyboard by a logged-in user carrying out a wipe-down cleaning cycle, including:
   displaying a cleaning message to the logged-in user that a cleaning cycle is required;
   monitoring key press events during the wipe-down process to determine which keys have been wiped and cleaned to determine completeness of the cleaning cycle;
   storing the key press events data and the logged-in user identification data, and reporting the cleaning cycle results; and,
   portraying an image of the keyboard on the display, and graphically indicating the keys that have been wiped and cleaned and thereby graphically directing the wipedown process to treat keys not yet cleaned.

20. The system for compelling cleaning the keyboard keys of claim 19, further including the step of incentivizing compliance with said cleaning message through positive reinforcement messages to the responsible individual for cleaning cycle completion, and sanctions for ignoring a cleaning message or failing to complete the cleaning cycle.

21. The system for compelling cleaning the keyboard keys of claim 19, further including the step of storing a unique identifying number of the keyboard with the key press events data and the logged-in user identification data.

22. The system for compelling cleaning the keyboard keys of claim 21, further including the step of storing on a remote server a remote report of the key press events data and the logged-in user identification data and the unique identifying number of the keyboard involved in each wipe-down cleaning cycle.

23. The system for compelling cleaning the keyboard keys of claim 22, further including the step of reviewing said remote report for administrative action.

24. The system for compelling cleaning the keyboard keys of claim 23, wherein said reviewing step further includes the step of incentivizing compliance with said cleaning message through positive reinforcement messages to the responsible individual for cleaning cycle completion, and sanctions for ignoring a cleaning message or failing to complete the cleaning cycle.

* * * * *